United States Patent [19]
Kishi et al.

[11] Patent Number: 5,875,954
[45] Date of Patent: Mar. 2, 1999

[54] BONDED PIPE AND METHOD FOR BONDING PIPES

[75] Inventors: Shinsuke Kishi, Osaka; Tsukasa Maenosono; Michio Sato, both of Kawasaki, all of Japan

[73] Assignee: Sumitomo Metal Industries, Ltd., Osaka, Japan

[21] Appl. No.: 687,487
[22] PCT Filed: May 1, 1996
[86] PCT No.: PCT/JP96/01198
  § 371 Date: Aug. 6, 1996
  § 102(e) Date: Aug. 6, 1996
[87] PCT Pub. No.: WO96/34717
  PCT Pub. Date: Nov. 7, 1996

[30] Foreign Application Priority Data

May 2, 1995 [JP] Japan ................................ 7-132703

[51] Int. Cl.⁶ .......................... B23K 31/02; B23K 101/04
[52] U.S. Cl. ...................... 228/194; 228/265; 285/288.9; 285/288.11
[58] Field of Search .................... 228/194, 195, 228/265, 173.2, 173.4; 285/288.1, 289.5

[56] References Cited

U.S. PATENT DOCUMENTS 647,468  4/1900  Brown et al. ...................... 228/173.4
3,149,415  9/1964  Hyver ...................... 228/265

FOREIGN PATENT DOCUMENTS 50-152954  12/1975  Japan .
54-133450  10/1979  Japan .
56-62685   5/1981   Japan .
2-75478    3/1990   Japan .
3-71950    3/1991   Japan .
4-75773    3/1992   Japan .
4-135081   5/1992   Japan .
5-220585   8/1993   Japan .
6-277859   10/1994  Japan .

Primary Examiner—Samuel M. Heinrich
Attorney, Agent, or Firm—Burns, Doane, Swecker & Mathis, LLP

[57] ABSTRACT

A bonded pipe produced by using the liquid phase diffusion process in which the pipe ends of pipes to be bonded are butted with an insert material lower in melting point than the pipe material against each other, wherein the thickness is increased in such a manner that the outside diameter of the butted portion is expanded and the inside diameter thereof is reduced. A method for bonding pipes in which pipe ends of the pipes are butted through an insert material lower in melting point than the pipe material against each other, and the butted portion is heated to and held at a holding temperature higher than the melting point of the insert material, whereby the insert material is diffused in liquid phase into the pipe material, characterized in that at the time point when the outer pipe face temperature of the above-mentioned butted portion reaches a value which is not less than the $A_1$ critical temperature of the pipe material and not more than the holding temperature in the process for raising the temperature of the pipe material, the application of a pressure in the pipe axial direction capable of plastically deforming the butted portion to the above-mentioned butted portion is started to increase the thickness of the butted portion.

18 Claims, 8 Drawing Sheets

5,875,954

BONDED PIPE AND METHOD FOR BONDING PIPES

FIELD OF THE INVENTION

The present invention relates to a bonded pipe produced by butting end faces of pipes against each other so as to be bonded, and to a method of bonding the pipes by the liquid phase diffusion bonding process.

DESCRIPTION OF RELATED ART

Heretofore, there has been known the liquid phase diffusion bonding process as a method of butting and bonding end faces of materials such as steel bars and steel pipes in which an insert material such as an amorphous metal lower in melting point than materials to be bonded is interposed between end faces to be bonded, and the end faces are butted; the butted portion is heated to be raised in temperature higher than the melting point of the insert material, for example, about 1100°–1300° C. (depending on the melting point of the insert material); and then the portion is kept at the temperature for a predetermined time so that the element of the melted insert material is diffused into the material to be bonded, thereby bonding the pipes to each other. Compared with the gas pressure welding process, this liquid phase diffusion bonding process performs bonding at a lower working temperature and at a smaller applied pressure, so that the method is characterized in that a secure bonding is performed without involving a large deformation in the bonded portion.

Generally in the liquid phase diffusion bonding process, the butted portion is heated in a state that an initial load is applied to the portion, and when a specified temperature is reached so that the element of the insert material is diffused, the load applied to the butted portion is allowed to be lowered, thereby preventing an excessive deformation. However, also in the liquid phase diffusion bonding process, when utilized for the connection of line steels such as steel bars, it may be desirable that a large pressure is applied to the bars in the axial direction in order to prevent an mismatch, so that the bars are compressed, thereby increasing the thickness of the butted portion. It is considered that increasing the butted portion needs to apply an compression force larger than the initial load when a specified temperature for the liquid phase diffusion bonding is reached at which the butted portion is in a plastic deformation-prone state.

Then, the application of this process to the solid material such as steel bars caused the periphery of the butted portion to develop an increased thickness. This allowed the contact of the end faces with each other to become secure, and the scraping/finishing to be performed without developing an insufficient wall thickness, thereby eliminating a dislocation.

As a method of increasing thickness securely, there have been proposed a method of making larger initial load than prior art (Japanese Patent Application Laid-Open No. 2-75478 (1990), Japanese Patent Application Laid-Open No. 3-71950 (1991)), a method of making larger initial load and performing arc welding at temperature higher than melting point of insert material (Japanese Patent Application Laid-Open No. 5-220585 (1993)), and a method of making larger initial load and applying further pressure during holding temperature after specified temperature is reached (Japanese Patent Application Laid-Open No. 6-277859 (1994)).

On the other hand, for the bonding of steel pipes, it is an essential subject that the rupture strength of the butted portion (hereinafter called the joint strength) is made larger than the rupture strength of the base metal of steel pipes (hereinafter called the base metal strength). In order to increase the joint strength by increasing bonding area on the butted portion, the present inventors tried to bond steel pipes by the use of the above-mentioned method of increasing thickness of steel bars, that is, a method in which a large compression force is applied to the steel pipes when a specified temperature for the liquid phase diffusion bonding is reached at which the butted portion is in a plastic deformation-prone state. Contrary to expectations, as shown in FIG. 1, it was found that the pipe wall thickness $t_1$ of the butted portion 2 of the steel pipes 1 was increased a little compared with the original pipe wall thickness (the pipe wall thickness at a portion not heated) to, while both the inside diameter and the outside diameter were expanded to develop an expanded pipe deformation in a broad-brimmed shape.

Such expanded pipe deformation is considered to occur by the following reason. That is, although steel pipes are apt to deform in the pipe diameter direction, the heat at the butted portion is conducted in the pipe axial direction to form a gentle temperature gradient with the bonded face taken as a peak point, and a significant length in the pipe axial direction is in a plastic deformation-prone state. This weakens an effect that the peripheral portion having a lower temperature and a higher rigidity than the butted portion restrains the butted portion at a high temperature from being plastically deformed in the pipe diameter direction, whereby the peripheral portion is deformed before the butted portion is compression deformed. The temperature distribution in the steel pipe section at this time is shown in FIG. 2. As shown in FIG. 2, the isothermal line is a gentle curve, and when a compression force P in this state is applied, a force $P_m$ toward the high temperature side perpendicular to the gentle curve, that is, to the outside is exerted. In this way the steel pipes are considered to develop an expanded pipe deformation as shown in FIG. 1.

In the butted portion developing significantly the expanded pipe deformation as shown in FIG. 1, the bending rigidity increases, while the bending moment acts on the bonded portion at the time of joint tensile test, so that the interface (bonded face) fractures before the base metal fractures. That is, the joint strength is lower than the base metal strength. The bonded portion becomes a stress concentration place and also a breakage starting point when in use. Grinding/finishing the outer face causes the wall thickness to become insufficient and thus strength to be lowered. In this way, simply applying of pressure in a plastic deformation-prone state to improve the joint strength of steel pipes causes rather the joint strength to be lowered. Therefore it is very important for hollow steel pipes to increase the wall thickness in a manner not to lower the joint strength.

The present invention has been made to solve such problems and in view of such demands, and it is an object of the invention to provide a bonded pipe having a high joint strength.

In the case where the pipe ends of steel pipes and the like are bonded to each other by the liquid phase diffusion bonding process, it is another object of the invention to provide a method of bonding pipes in which the butted portion bonded can be increased in the wall thickness by 10% or more in such a manner that an expansion of the inside diameter is hardly brought, for example, the expansion ratio of the inside diameter is limited to 1% or less.

SUMMARY OF THE INVENTION

The present inventors concentrated their effort on the study to solve the above-mentioned problems, with the result that they found the following facts. That is, when the narrow area of the butted portion is rapidly heated by the induction heating process, a steep temperature gradient with the bonded face of the butted portion taken as a peak point is formed midway through temperature rise, so that only the narrow area becomes a plastic deformation-prone state. When a large compression force is applied to develop a plastic deformation in a short time in that state, the low-temperature area adjacent to the narrow high-temperature area is large in the restraint in the pipe diameter direction, so that the plastic deformation is concentrated only on the narrow area. Also, the isothermal line in FIG. 2 approaches the direction perpendicular to the pipe axis, so that force $P_m$ acting outward becomes small, and thus under a proper condition, the state that the force also acts inward can be obtained. This causes an increased wall thickness to be obtained in a state that an expansion deformation of the inside diameter is reduced and avoided, or in a state that the inside diameter is reduced.

Considering that even when the outer face is scraped, a required wall thickness remains, and that the contact of butted faces with each other is made secure, and the contact area is made large to remarkably enhance the strength as a joint, it is preferable that the range of the thickness increase ratio $((t_1-t_0)/t_0)$ required for the pipe bonded portion is 10% or more. In order to obtain a sufficient joint strength, it is preferable that the reduction ratio of the inside diameter is $-1\%$ or more, that is, the expansion ratio of the inside diameter is 1% or less, or the inside diameter is reduced.

For bonded pipes in which the previously-beveled pipe ends have been bonded, $t_0$ is assumed to be the thickness of the edge of the butted portion after being beveled, rather than the pipe wall thickness. Also in this case, an increased thickness by 10% or more provides a good effect.

The method for bonding pipes in connection with the present invention in which an end of a pipe is butted with an insert material interposed, lower in melting point than the pipe material against each other, and the butted portion is heated to a temperature higher than the melting point of the insert material, whereby the element of the insert material is liquid phase diffused into the pipe material to bond the pipe ends to each other, is characterized in that at the time when the outer pipe face temperature of the above-mentioned butted portion reaches not lower than the $A_1$ critical temperature of the pipe material and not more than the holding temperature of the pipe material in the process for raising the temperature of the pipe material, the application of a pressure in the pipe axial direction capable of plastically deforming the butting portion to the same portion is started to increase the thickness of the butted portion. This causes the restraining force in the pipe diameter direction by the adjacent portion whose temperature does not reach an easy-to-plastic deformation value to act sharply in a narrow range, whereby a bonded structure can be obtained in which an increased thickness portion whose inside diameter is reduced, or hardly expanded (the inside diameter reduction ratio is $-1\%$ or more) is formed.

When at least one of the outer face and inner face of the pipe end is previously beveled by an amount corresponding to the increased thickness to be obtained, and then the above-mentioned bonding is performed, the post-process for grinding the increased thickness portion can be omitted, or the amount of scraping can be reduced.

It is preferable that the heating length in the pipe axial direction of the above-mentioned butted portion is one to five times as thick as the pipe wall thickness. This allows a temperature gradient steeper than prior art to be formed in the pipe axial direction. Also, it is more preferable that the heating length is three times or less to prevent surely a deformation involving an increased inside diameter. In view of the facility technology to obtain a required heating rate and a heating accuracy (an accuracy to avoid a dangerousness of separating the butted portion from the heating length), the practical lower limit of the heating length is equal to the pipe wall thickness, that is, one time.

Further, it is preferable that the heating rate in the heating process of the above-mentioned butted portion is 20° to 100° C./second. In the case where the heating rate is 20° C./second or more, the annular heating portion can be raised in temperature over the equal heating trend in the pipe axial direction. Therefore, a steep temperature gradient in the pipe axial direction is obtained, and in this state, further temperature rise can be effected. The upper limit of the heating rate is determined in view of facility economy.

Still further, it is preferable that the above-mentioned applied pressure is 15 to 100 MPa. Although the applied pressure force may be adjusted according to the plastic deformation resistance of the pipe material, temperature and applying time of pressure, usually with 15 MPa or more, an increased thickness by 10% or more is obtained without an expansion in pipe inside diameter. In the case where the applied pressure force exceeds 100 MPa, an unnecessary increased thickness may be formed, or an undesirable shape, for example, a sharply protruded increased thickness portion may be formed. Then, the bonded portion becomes a stress concentration place and also a breakage starting point when in use. Also in this case, a new problem develops that an amount of scraping increases. Further, in view of practical facility economy, it is preferable that the upper limit of the applied pressure force is 100 MPa.

Further, it is preferable that the above-mentioned pressure is applied for 0.1 to 3 seconds. The pressure applying time depends on the plastic deformation resistance, the temperature and the applied pressure force. Although a longer pressure applying time allows the thickness to be increased even for a lower applied pressure force, a deformation in a broad-brimmed shape is apt to occur. On the contrary, although a shorter pressure applying time requires a large applied pressure force, the applied pressure force is concentrated on a high-temperature portion, so that the thickness can be increased without developing a buckling. Therefore, it is preferable that the upper limit of the pressure applying time is within 3 seconds from the actual results of the plastic deformation in the butted portion. The lower limit thereof is about 0.1 second from the economical point of view.

Still further, in the temperature rising process before and after above-mentioned pressure application, and in the temperate holding process, a pressure force of 1 to 10 MPa lower than the above-mentioned applied pressure force is applied in the pipe axial direction to the above-mentioned butted portion. This allows the mutual close contact of end faces to be butted before and after the thickness increase processing. That is, there can be followed a disturbance such as the generation and increase in a butting interference margin due to thermal expansion, or the reduction and loss in an interference margin associated with a hot yield in the butted portion. A secure contact requires a force of 1 MPa or more, and it is preferable that the force is 10 MPa or less so as not to develop an undesirable plastic deformation in a high temperature region.

Still further, the heating to the above-mentioned butted portion can be performed by the induction heating process.

This allows the annular portion including the butted portion to be concentratedly and rapidly heated in a narrow range; and because of the heating not by heat transfer, the heating can be performed at a speed much more rapidly than that at which the above-mentioned concentricity is relieved with time by the heat diffusion in the pipe axial direction.

Still further, the heating by above-mentioned induction heating process employs a frequency of 5 to 50 kHz. In the induction heating, the higher the frequency is used, the more rapidly the temperature can be raised in a shallow place near the surface; and on the contrary, the lower the frequency is used, the more slowly the temperature can be raised in a deep place up to the back side (inner side). At less than 5 kHz, the above-mentioned heating rate cannot be obtained, and a steep temperature gradient in the pipe axial direction can not be obtained due to thermal conduction. At more than 50 kHz, the difference between the heating rate on the outer surface of the pipe and that on the inner surface is large, so that a desired temperature distribution may not be obtained. For the bonding of pipes (wall thickness of 2 to 40 mm) used for general piping, 5 to 50 kHz is preferably used. Therefore, the frequency to be used is preferably selected appropriately according to the pipe wall thickness and a desired heating rate. The outer diameter of the pipe can be coped with by adjusting power source output regardless of frequency.

Still further, the above-mentioned pressure application is started at a time when the outer surface temperature of the butted portion is not less than the $A_1$ critical point of the pipe material, not less than the melting point of the insert material, and is less than the holding temperature. The liquid phase diffusion bonding process is a bonding method by the constant temperature solidification associated with the diffusion of the insert material element, so that the diffusion bonding phenomenon proceeds remarkably at not less than the melting point of the insert material, and the smaller the insert material is diffused, the shorter the time of the bonding is completed. Therefore, the compressing operation after melting of the insert material allows the insert material in a liquid state not required for bonding to be discharged from the bonded face, so that it is preferable that the compressing operation in the present invention is performed at not less than the melting point of the insert material. In order to prevent the oxidation of the bonded material due to heating, the bonding may be performed in an inert gas or nitrogen gas atmosphere in the temperature rising process and the temperature holding process.

DESCRIPTION OF THE PREFERRED EMBODIMENTS

With reference to drawings showing embodiments, the present invention will be explained hereinafter.

Figure 3:
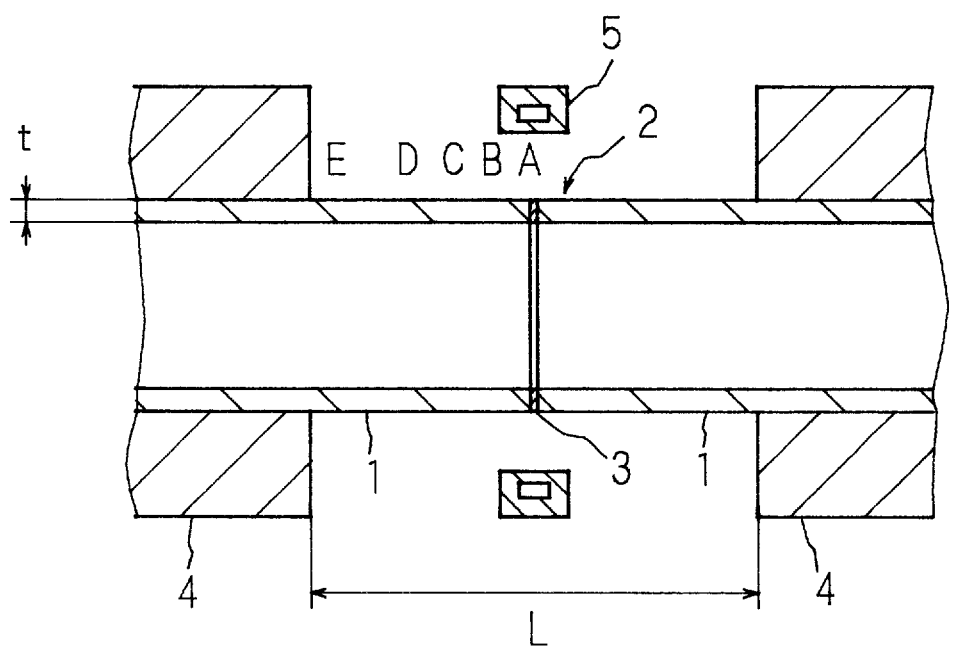
FIG. 3 is a schematic sectional view for explaining a state that a method of the present invention is performed.

FIG. 3 is a sectional view showing schematically a state that a method of the present invention is performed. Pipes 1, 1 whose pipe ends are to be bonded to each other are steel pipes or other hollow metallic material used for piping, cylinders and so on, and not particularly limited for their sectional shapes (and sizes). The pipes 1, 1 are held by clamps 4, 4, respectively, and their pipe ends are butted through an insert material 3. As the insert material, an Fe-base or an Ni-base amorphous metallic material and the like can be illustrated. Disposed around the butted portion 2 is an induction heating coil 5. The clamps 4, 4 are connected with a hydraulic mechanism (not shown) for exerting a desired compression force therebetween.

The present invented method is basically such that the ends of the pipes 1, 1 are butted through the insert material 3, and the butted portion 2 is heated by the induction heating coil 5 to effect the liquid phase diffusion bonding, in which method a large compression force is applied midway through the temperature rise to increase the thickness.

From point of element diffusion view, it is better that the thickness of the insert material 3 is thin to make the absolute amount less, and on the contrary, in that the adhesion between bonded faces is made higher by melting the insert material, the thicker thickness is better. Therefore, with these trade offs, the thickness is preferably selected according to the dimensions of end faces and degree of finishing or to applications with the heretofore proposed range 15 to 100 μm taken as a guide. In the case where the bonded face is machined to a roughness $R_{max} \leq 75$ μm to enhance the adhesion, the thickness of the insert material 3 is preferably selected within the range of 15 to 50 μm with an emphasis placed on the reduction of the absolute amount.

The reason why the butted portion is heated by the induction heating process using the induction heating coil 5 in the method of the present invention is that the annular portion including the butted portion 2 can be concentratedly and rapidly heated in a narrow range, and that because of the heating not by heat transfer, the heating can be performed at a speed much more rapidly than that at which the above-mentioned concentration is relieved with time by the heat diffusion in the pipe axial direction.

In performing the induction heating, the higher the frequency is used, the more rapidly the temperature can be raised in a shallow place near the surface. On the contrary, the lower the frequency is used, the more slowly the temperature can be raised in a deep place up to the back side. Therefore, the frequency to be used is preferably selected as appropriate according to the pipe wall thickness and a desired temperature rise speed. Usually, a frequency within a range of 5 to 50 kHz is preferably used.

The length in the pipe axial direction of the annular heating portion (the width of the induction heating coil 5) is preferable to be as narrow as possible to form a steep temperature gradient in the pipe axial direction and prevent an expanded pipe deformation, and the upper limit thereof should be five times as thick as the pipe wall thickness, preferably three times or less. On the other hand, in view of the facility economy to obtain a required heating rate the practical lower limit of the heating length is same as the pipe wall thickness.

Figure 5:
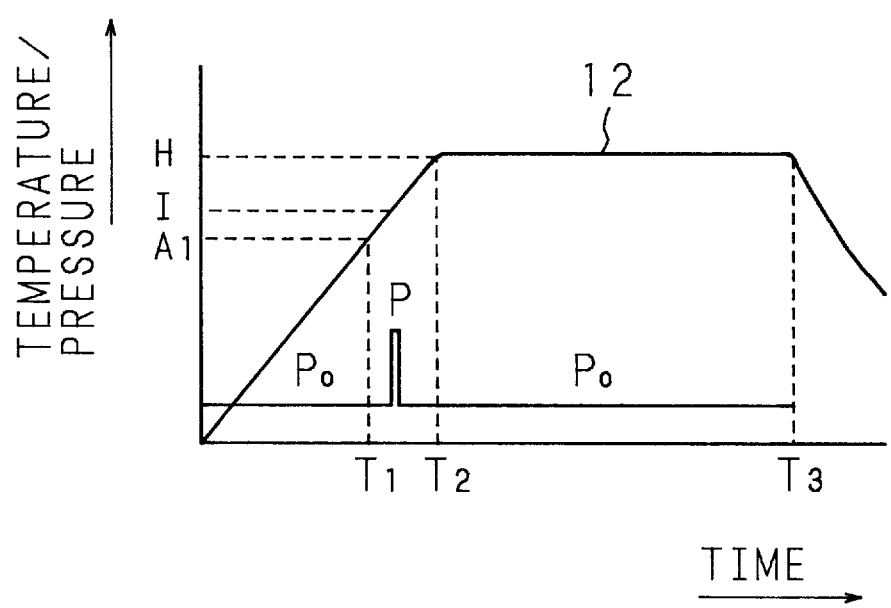
FIG. 5 is a graph showing with time the temperature of the butted portion and the compression force applied in the pipe axial direction when a method of the present invention is performed.

FIG. 5 is a graph showing with time temperature of the outer pipe face of the butted portion 2 and the applied pressure by the clamps 4, 4 in the bonding method according to the present invention. A curve 12 in the graph is the temperature of outer pipe face of the butted portion 2. After the butted portion 2 is raised in temperature until a predetermined temperature H suitable for the liquid phase diffusion bonding is reached, the temperature is substantially maintained.

It is preferable that the heating rate of the induction heating is as large as possible to raise the temperature in the annular heating portion over the equal heating trend in the pipe axial direction and to obtain a steep temperature gradient in the pipe axial direction with the annular heating portion taken as a peak point, and usually, the speed is selected to be 20° C./sec or more. On the other hand, the practical upper limit thereof is 100° C./sec in view of facility economy. In this manner, the annular heating within a narrow range is performed rapidly by the induction heating process, whereby the outer pipe face temperature distribution on the butted portion 2 is changed as shown in the order of curve 7, curve 8, followed by curve 9 in FIG. 4, thereby allowing a steep temperature gradient in the pipe axial direction to be developed.

Figure 4:
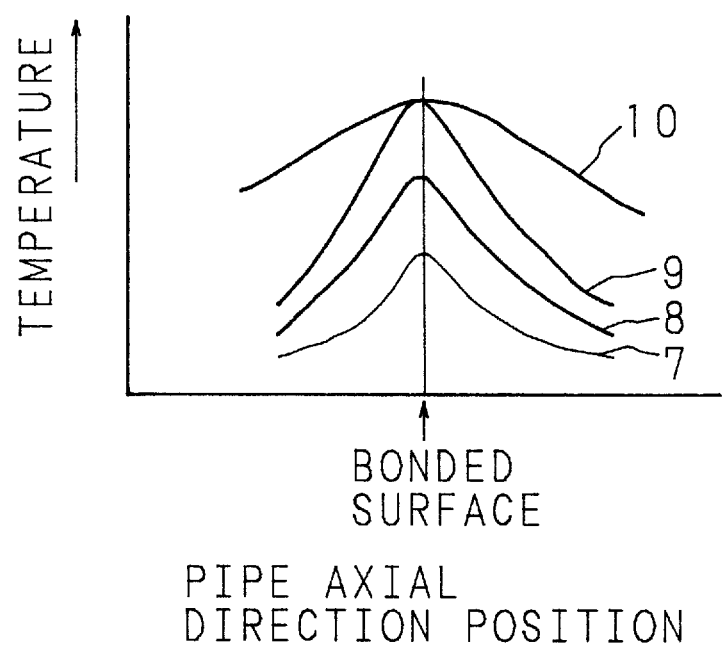
FIG. 4 is a graph showing a temperature distribution occurring on the butted portion when bonded.

However, the steep temperature gradient thus developed is equalized in heat soon after the temperature rising process is finished and the temperature holding step is reached, and thus the temperature gradient becomes gentle as shown by curve 10 in FIG. 4. Thus, the present invented method is characterized in that a compressing operation of applying a large compression force P required to effect an increased thickness is started within the temperature rising process of keeping a steep temperature gradient (curve 9 in FIG. 4), particularly after the temperature of the butted portion 2 becomes the $A_1$ critical point or more (at time $T_1$) and before the holding temperature H (at time $T_2$) is reached. The operation is finished in a short time. Although in FIG. 5, the heating rate (gradient of curve 12) within the temperature rising process is made constant, the speed may vary as far as a steep temperature gradient is developed in the pipe axial direction when the compressing operation is performed.

In the present invention, as described above, the compressing operation for increasing the thickness of the butted portion 2 is performed after the pipes are heated to the $A_1$ critical point or more. This purpose is to plastically deform the butted portion 2 in an easy-to-plastic deformation state. Generally, the $A_1$ critical point of steel material is about 600° C., and the holding temperature H is 1100° to 1300° C. higher than the melting point of the insert material (about 1000° C.). Therefore, in the case where steel pipes are bonded, the compressing operation is started at a temperature not less than 600° C. and not more than the holding temperature H (1100° to 1300° C.). The liquid phase diffusion bonding process is a bonding method by the constant temperature solidification associated with the diffusion of the insert material 3, so that the diffusion bonding phenomenon proceeds remarkably at not less than the melting point of the insert material 3, and the smaller the insert material 3 to be diffused is applied, the shorter in time the bonding is completed. Therefore, the compressing operation after the insert material 3 is melted allows the insert material 3 in a liquid state not required for bonding to be discharged from the bonded face. Hence, it is preferable that the compressing operation in the present invention is performed at not less than the melting point of the insert material 3. The higher the temperature of the pipe surface is, the smaller the compression force required to increase the thickness of the butted portion 2 is required, so that it is preferable that the temperature at which the compressing operation is started is higher as far as a steep temperature gradient in the pipe axial direction is maintained.

The temperature distribution in the butted portion 2 of pipes in compressing is preferably as steep a temperature gradient as possible. The present inventors confirmed that a temperature distribution makes it possible to perform a desirable thickness increase, in which a temperature difference of 400° to 600° C. exists between the bonded face of the butted portion 2 and the pipe body located away by four times as thick as the pipe wall thickness from the portion in the pipe axial direction. Therefore, the compressing operation is preferably performed in a state that the temperature difference is 400° to 600° C. It is also confirmed that this condition can be achieved by setting the heating coil width and the heating rate within the above-mentioned range, that is, at a value not more than five times the pipe wall thickness and a value not less than 20° C./second, respectively.

The compression time required to achieve a desired thickness increase ratio depends on the plastic deformation resistance and the compression force. A longer compression time theoretically allows the thickness increase to be performed with a smaller compression force. However, a longer time for thickness increasing operation causes a broad-brimmed deformation even when a steep temperature gradient in the pipe axial direction exists. On the contrary, when a large compression force is applied to perform the thickness increase processing in a short time, the compression force acts concentratedly on the narrow region of the highest temperature portion, whereby the region is increased in thickness and deformed without a buckling. Therefore, in the present invention, a large compression force P is applied in a short time to finish the thickness increasing in a short time. The upper limit of the above-mentioned time is preferably within 3 seconds in view of the results of the plastic deformation in the butted portion 2. A too short time is not the best way with respect to facility technology, so that about 0.1 second is the practical lower limit. Therefore, the time period for the compressing operation is preferably set at 0.1 to 3 seconds.

The compression force applied in the above-mentioned temperature raising period is preferably selected in such a manner as to obtain a desired thickness increase ratio within above-mentioned time period. For example, in the case where the present invention is applied to steel pipes, at not less than the melting point of the insert material 3, a compression force of 15 to 100 MPa corresponding to the temperature is applied, whereby an increased thickness of not less than 10% on the butted portion can be obtained with an expansion in pipe inside diameter hardly involved (at an inside diameter expansion ratio of 1% or less, that is, an inside diameter reduction ratio of −1% or more).

The applied pressure force may be adjusted according to the plastic deformation resistance and temperature of a pipe material and the applied pressure time. Usually, with 15 MPa or more, an increased thickness of 10% or more is obtained without involving an expansion in pipe inside diameter. When the pressure force more than 100 MPa is applied, the thickness may be increased unnecessarily, or an undesirable shape, for example, a sharply-protruded increased thickness shape may be formed. Then, the bonded portion becomes a stress concentration place and also a breakage starting point when in use. Also in this case, a new problem develops that a grinding scraping amount increases. Further, in view of practical facility economy, it is preferable that the upper limit of the applied pressure force is 100 MPa.

Figure 1:
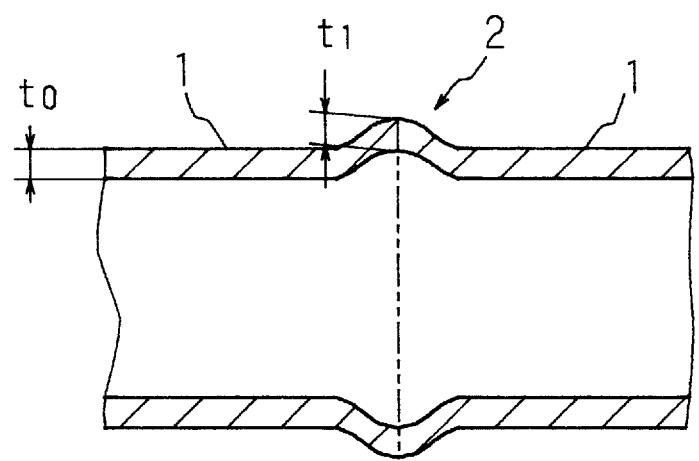
FIG. 1 is a typical sectional view showing the butted portion of a conventional bonded pipe.
Figure 2:
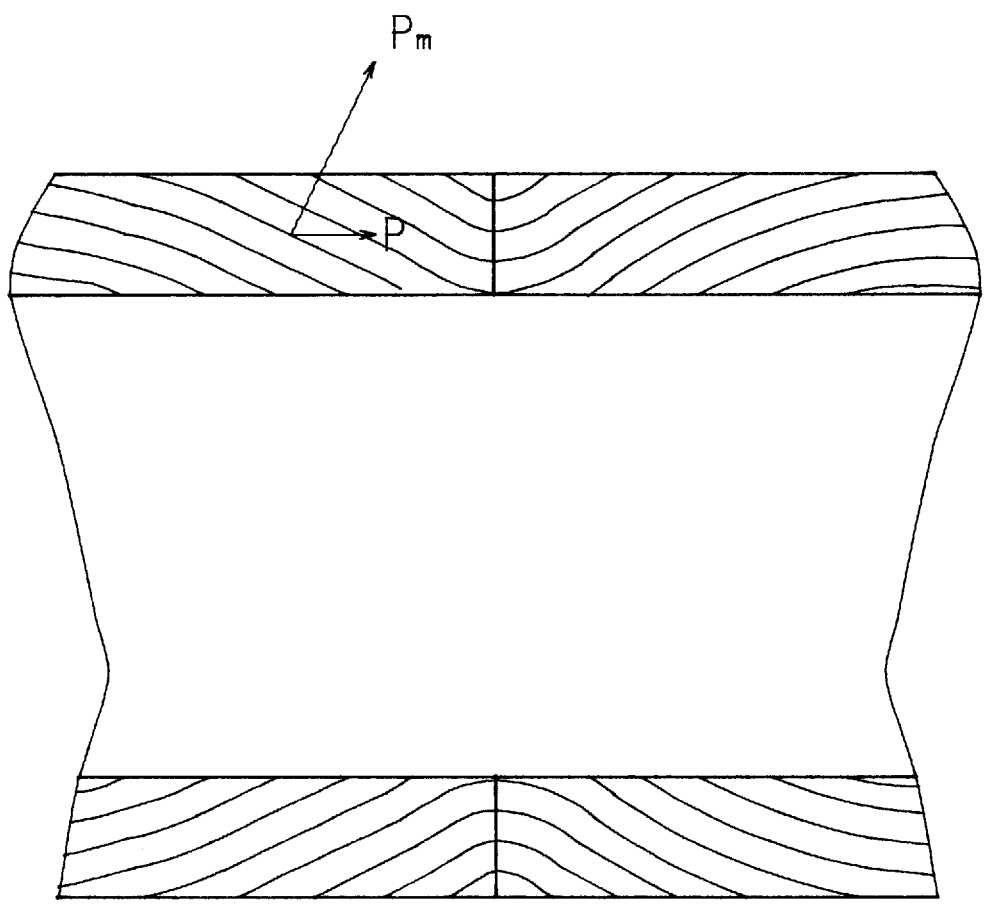
FIG. 2 is a typical enlarged view showing a temperature distribution of the butted portion at the bonding by a conventional process.

As described above, in the present invention, after the temperature of the butted portion 2 reaches the $A_1$ critical point or more, a compression force is applied to increase the thickness. Alternatively, it may be also considered that the thickness can be increased without the broad-brimmed shape by a compression force applied from the initial step of rising temperature to rapidly rise the pipe in that state (that is, in a pressure applying state). However, it was found that this method expands plastically deformable region to the pipe axial direction as the temperature increases. As the result, the pipe is apt to change in expansion trend as shown in FIG. 1 before the thickness increase occurs, so that an increase in inside diameter is hardly restrained. Also, the continuous application of the compression force from the time of a low temperature when the compression deformation is hardly developed is wasteful in energy consumption and thus undesirable. For this reason, the present invention employs the compressing operation in a short time after the $A_1$ critical point.

In the present invention, as described above, the thickness increase processing is performed on the butted portion to be bonded through the liquid phase diffusion with an expansion in pipe inside diameter hardly involved. Here, an intimate contact between end faces to be butted to each other must be maintained before and after the thickness increase processing. A means for such purpose is recommended in which a slight pressure of a substantially-constant steady pressure (initial load) $P_0$ is applied in the pipe axial direction during the liquid phase diffusion period (between time $T_0$ and $T_3$), as shown in FIG. 5. This is because the butting by position control is difficult to follow a disturbance with respect to the mutual end face contact state, such as the generation and increase in a butting interference margin due to thermal expansion, or the reduction and loss in a interference margin associated with a hot yield in the butted portion; while the butting with a slight pressure allows the contact state by a suitable pressure (steady pressure $P_0$) to be steadily continued even if the above-mentioned disturbance occurs.

The above-mentioned slight pressure application may be changed appropriately according to a change in temperature, while it is simple and easy that a constant pressure is applied from start to finish. In either case, in order to establish a positive contact, it is desirable that a pressure of 1 MPa or more is applied, and that in a high-temperature region, a pressure of 10 MPa or less is applied so as not to develop an undesirable plastic deformation.

In the present invention, a means for applying pressure in the pipe axial direction is arbitrary. For example, as shown in FIG. 3, the pressure can be applied by a system in which the clamps 4, 4 holding the pipes 1, 1 to be bonded are engaged with a hydraulic mechanism to be acted in such a direction that the distance therebetween is reduced. Such system can be automated by a construction in which the temperature of the heating portion is measured by a thermocouple or a radiation thermometer, and the measured results are reflected on the applied pressure force.

In the method of the present invention which employs a liquid phase diffusion bonding process with pipe ends butted against each other, the butted portion is heated by the induction heating process in which the heating length in the pipe axial direction and the heating rate is limited, as described above. In the temperature rising process in which a steep temperature gradient with the butted portion taken as a peak point exists continuously, a compression in the pipe axial direction is performed in a short time to allow the butted portion to be plastically deformed, whereby an increased thickness without an expanded pipe in a broad-brimmed shape is developed on the butted portion.

Such increased thickness can be realized by the above-mentioned temperature gradient forming measures in which the restraint in the pipe diameter direction by the adjacent portion to the vicinity of the butted portion is not made ambiguous in the pipe axial direction but exerted sharply. The butting liquid phase diffusion bonding process which is a subject of the present invention, is required to perform the compressing operation under a state that a steep temperature gradient once developed is not relieved and vanished with time. Further, the thickness is increased within a process of bonding the pipe ends to each other, that is, under a state that the selection of various conditions is limited. In addition, it is necessary to meet demands of coping with issues on unevenness and joint strength. Under such precondition, first, the invention takes the compressing operation within the temperature rising process as an essential condition. Further, by means for applying the pressure only in a short time, the compressing operation is finished during one frame when the shift of the above-mentioned steep temperature gradient to a high-temperature side is likely to stop as one stopped frame, whereby the thickness increase without expansion to a broad-brimmed shape can be brought to the butted portion only by applying a specified force required for plastic deformation. That is, the thickness increasing operation in the present invention is composed in combination with the temperature distribution associated with heating and a pressure application timing synchronized with the temperature distribution, thereby solving the problems with the present invention.

In the case where at least one of the outer face and inner face of the pipe end is previously beveled by an amount substantially corresponding to the amount of an increased thickness to be obtained, and then the above-mentioned bonding is performed, the postprocess of scraping the increased thickness portion can be omitted, or the amount of scraping can be reduced.

When a material to be bonded is heated to be raised in temperature and held in a sealed gas to prevent the oxidation of the material, a good effect is also obtained.

[Embodiment 1]

As pipes to be bonded, steel pipes (material JIS, SGP; size 200A×5.5 mm$^t$) are used; and as an insert material, an Fe-base amorphous metallic material (thickness 25 $\mu$m) having a melting point 1080° C. is used. As shown in FIG. 3, the pipes 1, 1 are held by the clamps 4, 4, and in a state that the insert material 3 is interposed between pipe ends, the pipe ends are allowed to contact intimately with each other, and disposed around the butted portion is the induction heating coil 5 (width 10 mm, that is, 1.8 times the pipe wall thickness t; frequency 15 kHz). A distance L between the clamps 4 and 4 at this time is 200 mm. The clamps 4, 4 are connected with a hydraulic mechanism (not shown) capable of exerting a required compression force therebetween. Further, in order to measure the temperature of the pipe, thermocouples are arranged to point A away 2 mm from the pipe end, point B away two times the pipe wall thickness t, point C away four times, point D away six times, and point E away twelve times.

Figure 6:
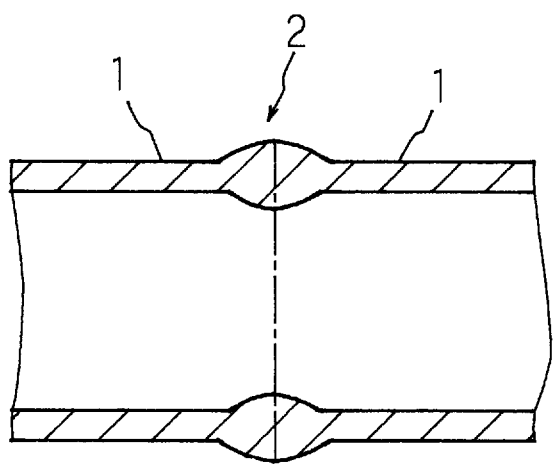
FIG. 6 is a typical sectional view showing the butted portion of the bonded pipe obtained by embodying a method of the present invention.
Figure 7:
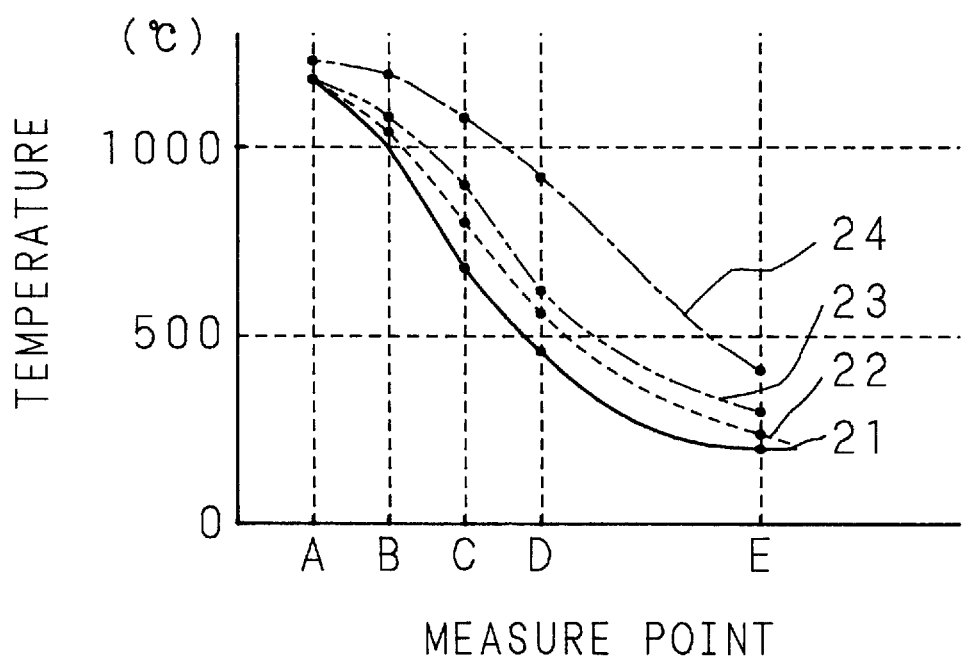
FIG. 7 is a graph showing a temperature distribution of the butted portion at the start of pressure loading in embodiments 1 and 2 and comparison examples 1 and 2.

A steady pressure $P_0$ of 5 MPa was applied to the pipes 1, 1 by the clamps 4, 4. The induction heating coil 5 was energized to heat the butted portion 2 in such a manner that the temperature of point A was raised at a rate 30° C./second. And midway through the heating, at a time when the temperature of point A reached 1200° C., the compression force P of 20 MPa was applied only for 2 seconds while continuing the temperature rise, and then the pressure was returned again to the initial state, that is, the steady pressure $P_0$ of 5 MPa. At a time when the temperature of point A on the butted portion 2 reached 1250° C., the temperature rise was stopped, and the temperature was kept for 2 minutes to perform the diffusion bonding. As a result, as shown in FIG. 6, an increased thickness was formed such that the butted portion 2 had no broad-brimmed trend and swelled to its outside diameter and inside diameter sides, whereby a good bonding was obtained. The thickness increase ratio in this case was 60%. The temperature distribution at a time when the compression force P was applied was as shown by curve 21 in FIG. 7 in which the temperature at point C away four times the pipe wall thickness is lowered sharply. When a Ni-base armophous metallic material (melting point 1040° C.) was used as the insert material, substantially the same results as above were obtained.

[Embodiment 2]

The same pipes as in Embodiment 1 were set in the same manner as in Embodiment 1, and bonding was performed in the same condition as in embodiment 1 except that the heating rate was set at 20° C./second by adjusting the power source output. As a result, an increased thickness (60%) was formed with a slight expansion of diameter (<1%) on the inside diameter side of the butted portion. The temperature distribution in this embodiment was as shown by curve 22 in FIG. 7.

[Embodiment 3]

The same pipes as in Embodiment 1 were set in the same manner as in Embodiment 1, and bonding was performed in the same condition as in Embodiment 1 except that the heating rate was set at 40° C./second by adjusting the power source output. As a result, an increased thickness (60%) was formed such that the butted portion 2 had no broad-brimmed expansion and swelled to its outside diameter and inside diameter sides.

[COMPARISON EXAMPLE 1]

The same pipes as in Embodiment 1 were set in the same manner as in Embodiment 1, and bonding was performed in the same condition as in Embodiment 1 except that the heating rate was set at 10° C./second by adjusting the power source output. As a result, as shown in FIG. 1, formed in the butted portion 2 was a deformation with a large broad-brimmed trend, that is, expanded diameter on both the inside and outside faces (inside diameter expansion ratio 3% or more), so that an increased thickness was hardly developed. The temperature distribution in this example was as shown by curve 23 in FIG. 7, in which the temperature gradient was significantly gentle.

[COMPARISON EXAMPLE 2]

The same pipes as in Embodiment 1 were set in the same manner as in Embodiment 1, then the temperature was raised at the same heating rate, and then bonding was performed in the same condition as in Embodiment 1 except that 10 seconds after the temperature reached 1250° C., the compression force P of 15 MPa was applied only for 2 seconds. Also in this case, as shown in FIG. 1, formed in the butted portion 2 was a deformation with a large broad-brimmed trend, that is, expanded diameter on both the inside and outside faces (inside diameter expansion ratio 3% or more), so that an increased thickness was hardly developed. The temperature distribution in this case was as shown by curve 24 in FIG. 7, in which the temperature gradient was significantly gentle.

[COMPARISON EXAMPLE 3]

The same pipes as in Embodiment 1 were set in the same manner as in Embodiment 1, then in a state that the compression force P of 20 MPa was applied from the beginning, the induction heating coil 5 was energized to heat the butted portion 2 in such a manner that the temperature of point A was raised at a rate 30° C./second. And midway through the heating, at a time when the temperature of point A approached 1200° C., the swell in the butted portion 2 became large, so that the large compressing was stopped, and the pressure was lowered to the steady pressure $P_0$ of 5 MPa. Then the liquid phase diffusion bonding was performed in the same condition as in Embodiment 1. In this case, although the inside diameter of the butted portion 2 was increased by about 4%, an increased thickness by about 10% was developed in the portion.

The embodying conditions and results with the above embodiments (ex.) 1 through 3, Comparison Examples (com.) 1 through 3, and the conventional example prior are collectively shown in tables 1 and 2.

As apparent from table 1, in Comparison Examples 1, 2 and the conventional example, the butted portion 2 has a large broad-brimmed trend and an increased thickness is not considerably developed, while in Embodiments 1 through 3, an expansion in inside diameter is hardly developed and an increased thickness is developed. Also, as apparent from FIG. 7, in Embodiments 1, 2, a steeper temperature gradient is developed compared with Comparison Examples 1, 2. Particularly, a large temperature difference between the bonded portion (point A) and point C away four times the pipe wall thickness is developed, and this temperature difference is considered to serve to restrain the broad-brimmed expansion in the butted portion 2. The larger the heating rate is, the steeper the temperature gradient becomes, and the broad-brimmed trend disappears. In Comparison Example 3, though an increased thickness is developed, the inside diameter expansion ratio is large.

As apparent from table 2, in Embodiments 1, 2, 3 and Comparison Examples 1, 2, a higher joint strength than the base metal strength was obtained in the tensile test, while in Comparison Example 1, a crack was developed in the reverse side bend test. In Comparison Example 3, the joint strength is lower than the base metal strength in the tensile test, and a crack was developed in the bend test. In the conventional example, the joint strength is higher than the base metal strength in the tensile test, and a break was developed in the bend test.

[Embodiments 4 Through 13]

The same pipes as in Embodiment 1 were set in the same manner as in Embodiment 1, and bonding experiment was performed by changing the heating length (width of the induction heating coil 5), the compression start temperature, the compression force and the like. Table 3 shows the embodying conditions and results in Embodiments 4 through 13.

Figure 8:
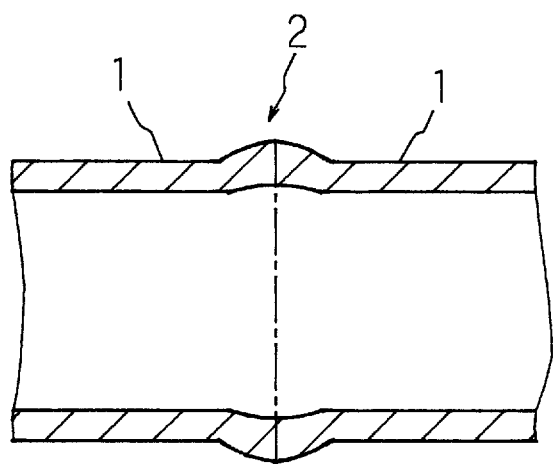
FIG. 8 is a typical sectional view showing the butted portion of the bonded pipe obtained by embodying a method of the present invention.

In Embodiments 4, 6, 9, 10, 11, 12, as shown in FIG. 8, an increased thickness shape was obtained such that the inside diameter expansion ratio is 0.3% or less. As apparent from Embodiment 1 in table 1, and Embodiments 4, 5 in table 3, for the heating length 10 mm (1.8 times the pipe wall thickness) and 15 mm (2.7 times the pipe wall thickness), only an increased thickness is developed without broad-brimmed expansion, while for the heating length 25 mm (4.5 times the pipe wall thickness), a broad-brimmed expansion is somewhat developed. Therefore, it is considered that a shorter heating length is preferable, and the length made about three times or less the pipe wall thickness is better to avoid the broad-brimmed expansion. Also as apparent from Embodiments 6 through 13, the shorter the pressure application time, the smaller the broad-brimmed expansion is. Therefore, the compression in a short time of 3 seconds or less is very effective to prevent the broad-brimmed expansion. Although the compression start temperature, any of 900° C., 1000° C., 1200° C. allows the thickness increase with a small broad-brimmed expansion to be performed, as higher the temperature is, with the smaller compression force and the shorter time, the compressing operation can be performed, and in addition, the broad-brimmed expansion is hardly developed. Therefore, it is understood that the compressing operation at a higher temperature and in a shorter time is suitable.

Although the above-mentioned embodiments describe the bonding of steel pipes, they are not limited to the steel pipes.

Industrial Applicability

As apparent from the above description, the present invention is constructed such that when the pipe ends are butted against each other to be bonded by the liquid phase diffusion bonding process, the compression force is applied in the pipe axial direction at a temperature not less than the $A_1$ critical point and not more than the holding temperature in a short time in the process of raising the temperature of the butted portion to effect the plastic deformation, and the present invention utilizes the induction heating process to more rapidly raise the temperature of a narrow region than prior art, whereby in a state that a steep temperature gradient is developed in the pipe axial direction, the narrow region of the butted portion is compressed to perform the thickness increase. This allows an increased thickness bonded portion with a negligible broad-brimmed expansion to be formed, for example, in which the thickness increase ratio is 10% or more, the inside diameter reduction ratio is −1% or more, that is, the inside diameter expansion ratio is 1% or less (including 0%), or a bonded portion whose inside diameter is reduced can be formed. Hence, the following effects can be obtained:

① The bonded face at the pipe ends are processed for thickness increase, so that the accuracy for the contact between the faces is improved, and the contact area is increased. This allows the reliability improvement including the unevenness prevention with respect to the pipe joint portion to be improved.

② The inside diameter of the bonded portion is hardly increased, so that the scraping/finishing of the outer face can be performed without lowering the strength. This allows the commodity value to be improved.

③ The mismatch adjusting work can be omitted without substantially involving an increased load on work, and the nondefective rate in the joint execution is significantly increased, thereby improving the workability.

TABLE 1

|  | HEAT-ING LENGTH (mm) | HEAT-ING SPEED (°C./sec) | COMPRESSION START TEMPERATURE (°C.) | TEMPERATURE DIFFERENCE BETWEEN POINTS A AND B (°C.) | PRES-SURE (MPa) | PRESS-ING TIME (sec) | CONSTANT PRESSURE (MPa) | INCREASED THICKNESS RATIO (%) | INSIDE DIAMETER EXPANSION RATIO | COM-MENT |
|---|---|---|---|---|---|---|---|---|---|---|
| EX. 1 | 10 | 30 | 1200 | ≈500 | 20 | 2 | 5 | 60 | NO | ⊙ |
| EX. 2 | 10 | 20 | 1200 | ≈450 | 20 | 2 | 5 | 60 | S | ○ |
| EX. 3 | 10 | 40 | 1200 | ≈600 | 20 | 2 | 5 | 60 | NO | ⊙ |
| COM. 1 | 10 | 10 | 1200 | ≈350 | 20 | 2 | 5 | <10 | L | X |
| COM. 2 | 10 | 30 | 1200 | ≈150 | 15 | 2 | 5 | <10 | L | X |
| COM. 3 | 10 | 30 | NORMAL | ≈0 | 20 | 80 | 5 | 10 | L | X |
| PRIOR | 50 | 10 | 1200 | ≈50 | 20 | 10 | 5 | <10 | LL | XX |

INSIDE DIAMETER EXPANSION RATIO:
NO—<0.3%
S—0.3–1%
M—1–3%
L—3–10%
LL—>10%

TABLE 2

|  | JOINT TENSILE STRENGTH | BREAK POSITION | BEND TEST |
|---|---|---|---|
| EX. 1 | 1.12 | BASE METAL | GOOD |
| EX. 2 | 1.08 | BASE METAL | GOOD |
| EX. 3 | 1.11 | BASE METAL | GOOD |
| COM. 1 | 1.03 | BASE METAL | CRACK (1 mm) |
| COM. 2 | 1.05 | BASE METAL | GOOD |
| COM. 3 | 0.99 | BONDING INTERFACE | CRACK (1.5 mm) |
| PRIOR | 0.98 | BONDING INTERFACE | BREAK |

JOINT TENSILE STRENGTH: $\dfrac{\text{JOINT STRENGTH}}{\text{BASE METAL STRENGTH}}$

TABLE 3

| | HEATING LENGTH (mm) | HEATING SPEED (°C./sec) | COMPRESSION START TEMPERATURE (°C.) | TEMPERATURE DIFFERENCE BETWEEN POINTS A AND B (°C.) | PRESSURE (MPa) | PRESSING TIME (sec) | CONSTANT PRESSURE (MPa) | INCREASED THICKNESS RATIO (%) | INSIDE DIAMETER EXPANSION RATIO | COMMENT |
|---|---|---|---|---|---|---|---|---|---|---|
| EX. 4 | 15 | 30 | 1200 | ≈500 | 20 | 1 | 5 | 15 | NO | ⊚ |
| EX. 5 | 25 | 30 | 1200 | ≈400 | 20 | 1 | 5 | 15 | S | ○ |
| EX. 6 | 15 | 30 | 1000 | ≈500 | 20 | 2 | 5 | 40 | NO | ⊚ |
| EX. 7 | 15 | 30 | 1000 | ≈500 | 20 | 3 | 5 | 60 | S | ○ |
| EX. 8 | 15 | 30 | 1000 | ≈500 | 20 | 5 | 5 | 80 | M | Δ |
| EX. 9 | 15 | 30 | 1000 | ≈500 | 30 | 2 | 5 | 60 | NO | ⊚ |
| EX. 10 | 15 | 30 | 1000 | ≈500 | 40 | 2 | 5 | 80 | NO | ⊚ |
| EX. 11 | 15 | 30 | 1200 | ≈500 | 40 | 2 | 5 | 110 | NO | ⊚ |
| EX. 12 | 15 | 30 | 900 | ≈450 | 20 | 2 | 5 | 30 | NO | ⊚ |
| EX. 13 | 15 | 30 | 900 | ≈450 | 30 | 3 | 5 | 80 | S | ○ |

INSIDE DIAMETER EXPANSION RATIO:
NO—<0.3%
S—0.3–1%
M—1–3%

What is claimed is:

1. A bonded pipe produced by a process in which pipe ends of first and second pipes are bonded together, the first and second pipes have substantially the same diameters and wall thicknesses at the pipe ends and along the length thereof, the pipe end of the first pipe is butted against the pipe end of the second pipe with an insert material interposed, lower in melting point than the pipe material, and the butted portion is heated to and held at a temperature higher than the melting point of the insert material, whereby the insert material is diffused in liquid phase into the pipe material to bond the pipe ends to each other, characterized in that the thickness of the butted portion is increased in such a manner that the outside diameter of the butted portion is expanded and the inside diameter thereof is reduced.

2. A bonded pipe produced by a process in which pipe ends of first and second pipes are bonded together, the first and second pipes have substantially the same diameters and wall thicknesses at the pipe ends and along the length thereof, the pipe end of the first pipe is butted against the pipe end of the second pipe with an insert material interposed, lower in melting point than the pipe material, and the butted portion is heated to and held at a temperature higher than the melting point of the insert material, whereby the insert material is diffused in liquid phase into the pipe material to bond the pipe ends to each other, characterized in that the thickness increase ratio of the butted portion is 10% or more, the inside diameter reduction ratio thereof is −1% or more.

3. A method for bonding pipes in which pipe ends of first and second pipes are bonded together, the first and second pipes have substantially the same diameters and wall thicknesses at the pipe ends and along the length thereof, the pipe end of the first pipe is butted against the pipe end of the second pipe with an inset material interposed, lower in melting point than the pipe material, and the butted portion is heated to and held at a holding temperature higher than the melting point of the insert material, whereby the insert material is diffused in liquid phase into the pipe material, characterized in that at the time when the outer pipe face temperature of said butted portion reaches a value which is not less than the $A_1$ critical temperature of the pipe material and not more than said holding temperature of the pipe material in the process of raising the temperature of the pipe material, the application of a pressure in the pipe axial direction capable of plastically deforming the butted portion is started to make the butted portion thicker.

4. A method for bonding pipes in which pipe ends of first and second pipes are bonded together, the first and second pipes have substantially the same diameters and wall thicknesses at the pipe ends and along the length thereof, the pipe end of the first pipe is butted against the pipe end of the second pipe with an insert material interposed, lower in melting point than the pipe material, and the butted portion is heated to and held at a holding temperature higher than the melting point of the insert material, whereby the insert material is diffused in liquid phase into the pipe material, the method comprising steps of beveling at least one of the outer face and inner face of the pipe end, and of starting the application of a pressure in the pipe axial direction capable of plastically deforming the butted portion at the time when the outer pipe face temperature of said butted portion reaches a value which is not less than the $A_1$ critical temperature of the pipe material and not more than said holding temperature of the pipe material in the process of raising the temperature of the pipe material, so as to increase the thickness of the butted portion.

5. A bonding method as described in claim 3, characterized in that the heating length in the pipe axial direction of said butted portion is one to five times the pipe wall thickness.

6. A bonding method as described in claim 3, characterized in that the heating rate in the process of heating said butted portion is 20° to 100° C./second.

7. A bonding method as described in claim 3 characterized in that said applied pressure is 15 to 100 MPa.

8. A bonding method as described in claim 3 characterized in that said pressure application is performed for 0.1 to 3 seconds.

9. A bonding method as described in claim 3 characterized in that a pressure force of 1 to 10 MPa is applied to said butted portion in the pipe axial direction in the heating process before and after said pressure application and in the temperature holding process.

10. A bonding method as described in claim 3 characterized in that the heating to said butted portion is performed by the induction heating process.

11. A bonding method as described in claim 10, characterized in that the heating by said induction heating process employs a frequency of 5 to 50 Hz.

12. A bonding method as described in claim 3 characterized in that said pressure application is started at a time when the outer pipe face temperature reaches a value not less than the melting point of the insert material and not more than the holding temperature of the pipe material.

13. A bonding method as described in claim 3 characterized in that the wall thickness of the pipe material is increased by 10% or more.

14. A bonded pipe as described in claim 1, characterized in that the pipes are steel pipes and the insert material is an amorphous metallic material.

15. A bonded pipe as described in claim 14, wherein the amorphous metallic material is an iron-base or nickel-base alloy.

16. A bonding method as described in claim 3, characterized in that the pipes are steel pipes and the insert material is an amorphous metallic material.

17. A bonding method as described in claim 3, characterized in that the pipes are steel pipes and the insert material is an amorphous metallic material wherein the amorphous metallic material is an iron-base or nickel-base alloy.

18. A bonding method as described in claim 3, characterized in that the pipes are steel pipes and the heating effects a temperature gradient in an annular zone at the butted portion sufficient to prevent an increase in the inner diameter of the pipes of the butted portion during the step of plastically deforming the butted portion.

* * * * *